Nov. 8, 1938.　　　R. A. THOMPSON　　　2,135,861
PULL BROACHING MACHINE
Filed Aug. 7, 1935　　　2 Sheets-Sheet 1
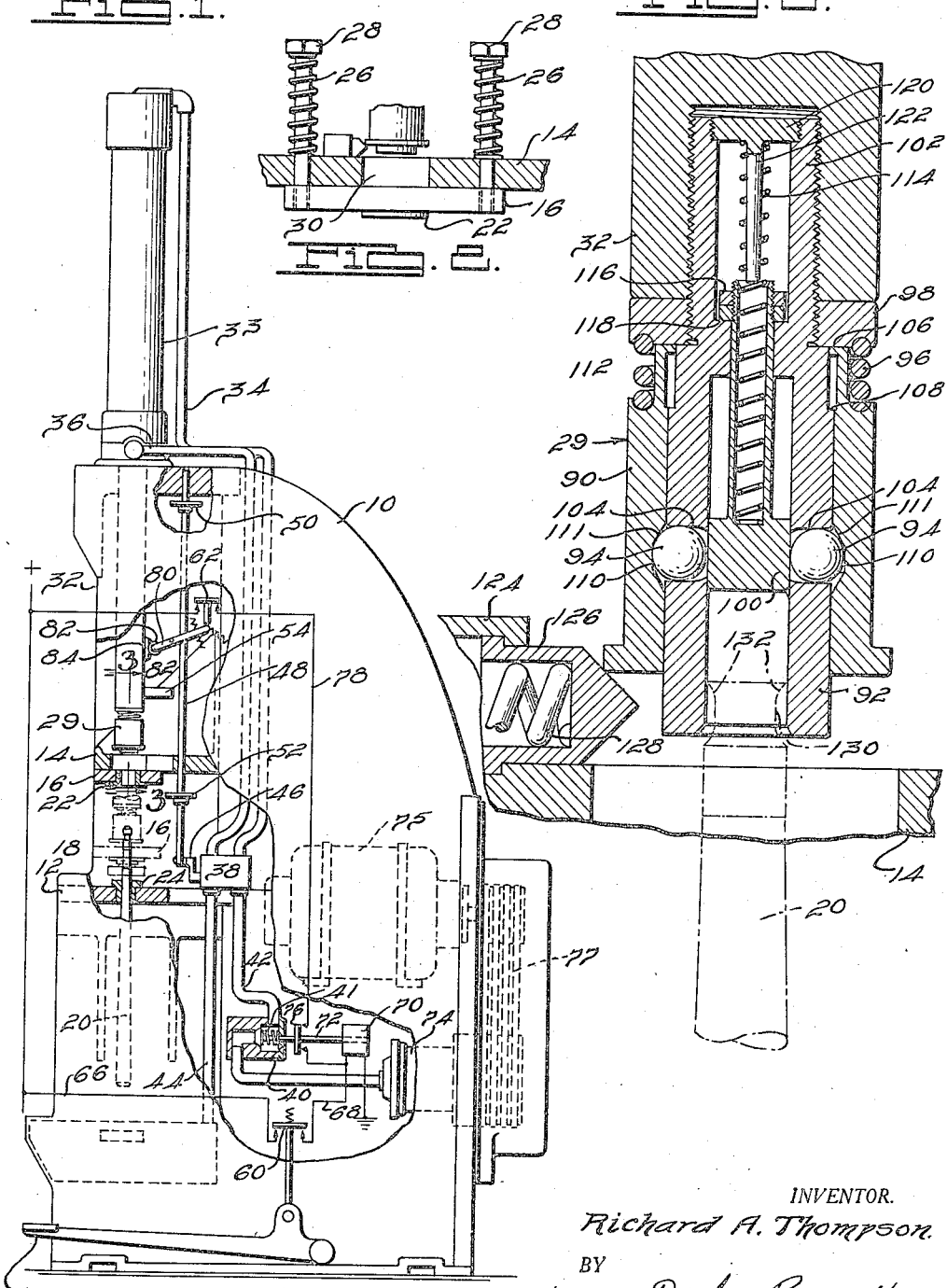

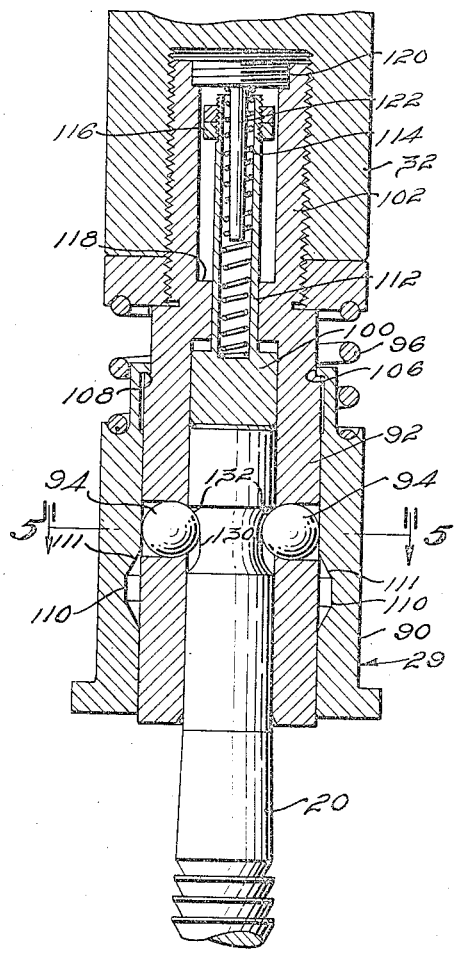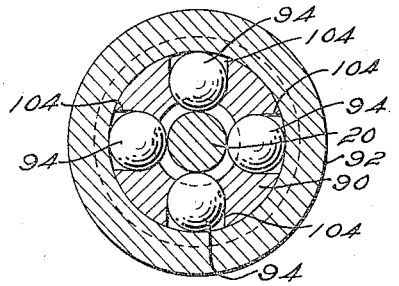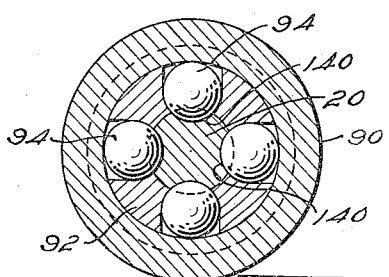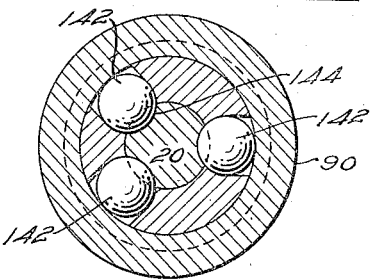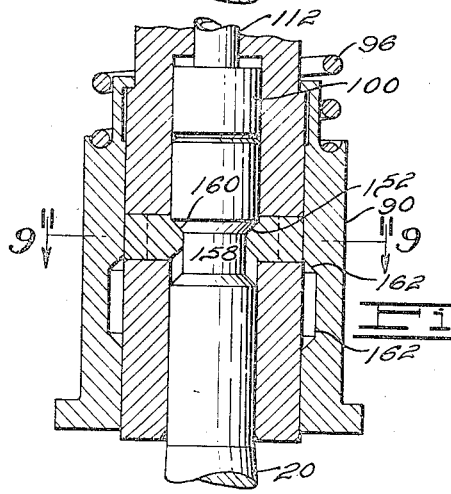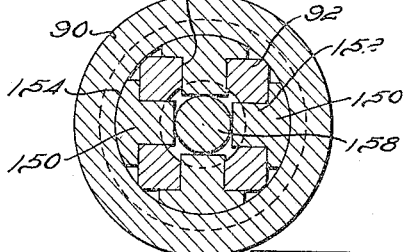

Patented Nov. 8, 1938

2,135,861

UNITED STATES PATENT OFFICE 2,135,861

PULL BROACHING MACHINE

Richard A. Thompson, Detroit, Mich., assignor to Colonial Broach Company, a corporation of Michigan Application August 7, 1935, Serial No. 35,693

11 Claims. (Cl. 90—33)

The present invention relates to machines for operating metal working tools, and particularly to broaching machines arranged to provide an automatic operating cycle.

It is an object of the present invention to provide an operating machine for broaching tools constructed to provide an automatic work cycle.

It is also an object of the present invention to provide a broaching machine constructed to move a broaching tool through a work cycle including a work movement and a return movement.

It is also an object of the present invention to provide a broaching machine of the last mentioned type and embodying means to release the broaching tool during the course of the return movement, and to re-engage the broaching tool at the beginning of the work movement.

It is also an object of the present invention to provide a machine of the last mentioned type embodying tool head constructed to grip the broaching tool and draw it through an aperture or across a surface, and to thereafter release the broaching tool.

It is also an object of the present invention to provide a broaching machine of the above mentioned type in which a tool head moves through a reciprocating path, grips the broaching tool at the beginning of a work movement, draws it through a work piece, and automatically releases it during the course of a return movement.

It is also an object of the present invention to provide a broaching machine embodying a tool head constructed of two or more relatively movable members, the gripping action being rendered effective and ineffective in accordance with the relative movement of such members.

It is also an object of the present invention to provide a broaching machine embodying a tool head, constructed of two or more relatively movable members, certain of which embody recesses for the reception of engaging elements, and also embodying means to move such elements into and out of such recesses to thereby release and engage such tool.

It is also an object of the present invention to provide a broaching machine which is of relatively simple construction, economical of manufacture, and accurate and positive in operation.

Other objects and advantages of the present invention appear in the following description and in the appended claims.

In the drawings, throughout which corresponding reference characters refer to corresponding parts, Figure 1 is a view in side elevation, partly in section, of an illustrative embodiment of the present invention;

Figure 2 is a view in elevation of a work support;

Figure 3 is a view in vertical section taken along the lines 3—3 of Figure 1.

Figure 4 is a view in vertical section of the subject matter of Figure 3, but illustrating the parts in the position occupied during a work movement;

Figure 5 is a view in horizontal section taken along the lines 5—5 of Figure 4;

Figure 6 is a view corresponding in general to Fig. 5 and illustrating one modification of the present invention;

Figure 7 is a view corresponding in general to Fig. 5 and illustrating a second modification of the present invention; and Figure 8 is a view in vertical section of a third modified embodiment of the present invention; and Figure 9 is a view in horizontal section taken along the line 9—9 of Fig. 8.

In the broaching of apertures, a conventional work cycle includes the steps of placing a work piece over the end of a broaching tool, connecting the broaching tool to a working head which thereafter draws the broach through the aperture in the work piece, machining it to a desired dimension, releasing the broach from the working head and placing a new work piece thereover. In accordance with the present invention, the above enumerated steps occur automatically.

As illustrated, the broaching machine of the present invention comprises generally a tool head, connected for movement in a reciprocating path. The reciprocatory movement of the tool head may be accomplished in various ways, the illustrated mechanism including a fluid pressure operated cylinder and suitable valve and pump mechanism therefor, to cause movement in either direction, automatic reversal at end positions, and to cause an automatic stopping at a selected intermediate or loading position. Suitable manually controlled means are provided to initiate the movement of the tool head.

The broaching tool is normally supported, independently of the working head, in a loading position. In this position, the stock to be broached may be placed over the broaching tool. At the beginning of the work movement, the tool head moves downwardly into engagement with the broaching tool, the engaging movement resulting in the broaching tool being gripped by the tool head. At this stage of the cycle, the movement of the tool head is automatically reversed, carrying the broaching tool with it, and in the course of such reverse movement, the broaching tool is drawn through the stock, machining the aperture therein to a desired dimension. At the conclusion of the drawing movement, the movement of the tool head is again reversed and, as the loading position is reached, the tool head is automatically caused to release the broaching tool, which thereupon drops to the first mentioned loading position, in which new stock may be placed over it in readiness for the next operation.

The tool head itself comprises in general an outer sleeve, resiliently connected to the tool head actuating mechanism; an intermediate sleeve relatively rigidly connected to the actuating mechanism, and cored out to receive the end of the broaching tool; gripping elements disposed within openings in the intermediate sleeve, and also disposed under certain conditions to enter recesses formed in the side walls of the first mentioned outer sleeve and under certain other conditions to enter an annular recess formed near the broaching tool head; and a spring biased plunger to expel the broach and to control the position of the gripping elements when the broach is released.

In accordance with certain illustrated embodiments, the just mentioned gripping elements comprise metal spheres or balls, nested in openings formed in the previously mentioned intermediate sleeve. As described more in detail hereafter, depending upon the number and relative positioning of the gripping balls around the intermediate sleeve, and the formation of the broach end, the head may be arranged to receive the broaching tool in any rotative position, in only certain positions, or in only a single position.

In accordance with a modified embodiment of the present invention, the gripping elements comprise members distributed around the intermediate sleeve, and disposed to be slid between tool engaging and tool releasing positions.

In the practice of both of the just mentioned modifications, in gripping the tool, the gripping elements are moved into a recess or recesses formed near the end of the broaching tool. To release the tool, the movement of the outer sleeve is temporarily interrupted as the working head approaches the loading position, so that continued movement of the tool head causes the intermediate sleeve to move relatively to the outer sleeve. This movement brings a recess in the outer sleeve into registry with the gripping elements, which accordingly move into such recess, releasing the tool. The force which moves the gripping elements into the outer sleeve recess is applied by the previously mentioned plunger, also housed within the intermediate sleeve, and which is constantly urged by a spring to a tool releasing position. Upon release of the tool also, the plunger moves into the path of the gripping elements, maintaining them in the tool releasing position.

Considering the above mentioned elements in more detail, and referring particularly to Figs. 1 and 2, the broaching machine may comprise generally a supporting frame 10, within which is formed a work table 12 and auxiliary supporting surfaces 14 and 16. During a work movement the work piece, illustrated at 18, and through which the broaching tool 20 passes, bears against a collar 22 fitted into a support 16. In loading position, the work piece 18 rests upon a corresponding collar 24, supported on the work table 12. The support 16 is normally resiliently biased into engagement with the support 14, as shown in Fig. 2, by springs 26, which surround bolts 28. Bolts 28 are freely slidable through openings in support 14 and are suitably secured in support 16.

In operation, as hereinafter described, in moving from a loading position to a tool engaging position the tool head designated as a whole 29 passes through the opening 30 in support 14, carrying support 16 and collar 22 with it, against the force of springs 26, and passes over the end of tool 20. The loading position of head 29 is shown in full lines in Fig. 1, and the tool engaging position is shown in dotted lines.

The actuating mechanism for head 29 comprises piston 32, slidably supported in cylinder 33. Cylinder 33 is supported upon frame 10 and is provided with fluid pressure lines 34 and 36 which enter it at opposite ends. Lines 34 and 36 are connected to a suitable reversing valve 38, to which the supply and exhaust lines 42 and 44, respectively, are also connected.

The position of valve 38 is controlled by an actuating arm 46, connected to a push rod 48. Push rod 48 is provided with upper and lower collars 50 and 52 respectively, disposed for engagement and movement by a cam 54, carried by piston 32. When piston 32 reaches the upper limit of its stroke, cam 54 engages collar 50, moving it to the illustrated position, and also moving arm 46 of valve 38 to the illustrated position. In such illustrated position, line 34 is connected to the line 42 and line 36 is connected to exhaust line 44. Accordingly, piston 32 is caused to move downwardly within cylinder 30. When cylinder 30 reaches the lower limit of its stroke, cam 54 engages the lower collar 52, moving push rod 48 and arm 46 downwardly, reversing the valve connections, and completing valve connections to cause upward movement of piston 32.

The starting of the movement of piston 32 and the automatic interruption thereof at an intermediate loading point, is effected by switch 60, and switch 62 respectively. Switch 60 is biased to the illustrated open position in any suitable manner, and is arranged for manual closure by a pedal 64. Momentary closure of switch 60 completes a circuit from the positive side of a suitable source of supply through conductor 66, switch 60, conductor 68, and through the solenoid 70 of valve 40 to ground. Upon completion of this circuit, solenoid 70 actuates plunger 72 to open valve 40, connecting supply line 42 to a suitable pump 74. This action also closes the auxiliary valve-operated contact 76, completing a self-holding circuit for solenoid 70 by way of conductor 78, which is independent of switch 60, but which is subject to switch 62. A motor 75 drives pump 74 through belting 77.

Switch 62 is of the normally closed type, and is disposed for movement to an open position by arm 80 pivotally mounted on a pin 82. Arm 80 terminates in a roller 82, which lies in the path of a cam 84 supported on piston 32. When, in the downward movement of piston 32, cam 84 engages roller 82, arm 80 is rotated in a counter-clockwise direction, and engages and opens switch 62. This latter action interrupts the previously described self-holding circuit for solenoid 70, permitting valve 40 to move to the illustrated closed position under the influence of biasing spring 41. As will be understood, this action brings piston 32 to rest. Engagement of roller 82 by cam 84 during upward movement of piston 32, however, rotates arm 80 in the clockwise direction, away from switch 62, and so does not affect the position of the latter. It will be seen, therefore, that in response to each closure of switch 60, by pedal 64, piston 32 moves from an illustrated loading position, down to a tool engaging position, at which point collar 52 is engaged by cam 54. At this time the movement of piston 32 is reversed and is continued in the opposite direction to the upper limit of travel, at which time the movement thereof is again reversed by the engagement of collar 50 by cam 54. When in the downward movement of piston 32, cam 84 engages roller 82, switch 62 is opened, interrupting the piston movement at the loading position.

Referring more particularly to Figs. 3, 4 and 5, the tool head 29 comprises generally the outer sleeve 90, the intermediate sleeve 92, the tool gripping balls 94, the biasing spring 96, and the plunger 100.

The intermediate sleeve 92 is provided with a hollow threaded extension 102, which is threaded into and secured in position with respect to the piston 32; and is cored out throughout its main or shank portion to receive the head of broaching tool 20 somewhat freely, and to also slidably receive the plunger 100. It is also provided with a plurality of cylindrical recesses 104, which provide communication between the interior and exterior thereof, and support the balls 94. The recesses 104 are slightly restricted at the inner ends, so that the balls are positively prevented from moving inwardly more than a predetermined extent.

The outer sleeve 90 slidably received over sleeve 92, and at its upper end is provided with an inwardly extending rim 106, for cooperation with a corresponding annular shoulder 108 formed in sleeve 92, to thereby limit the relative movement between the two sleeves. A spring 96, seated between sleeve 90 and collar 98, urges sleeve 90 into the position illustrated in Fig. 4. Collar 98, as shown, is threaded down on the extension 102 of sleeve 92. Sleeve 90 is also provided with recesses 110, for the reception of balls 94 under the conditions hereinafter described. The edges 111 of recess 110 are sloped, to provide a cam action, later described.

Plunger 100 is provided with an upwardly extending hollowed out shaft 112, within which a spring 114 is received. The upper end of portion 112 is threaded, to receive the lock nuts 114, which bear against the inner shoulder formed in shank 102, and limit the downward movement of plunger 100. The upper end of spring 114 is seated on a collar 120, provided with a downwardly extending core 122. Collar 120 is threadedly secured within the upper end of shank 102.

A broach releasing cam 124 is suitably supported, as illustrated, upon work support 14, and comprises the plunger 126, biased outwardly to the position illustrated in Fig. 3 by a relatively strong spring 128. The strength of spring 128 is in excess of that of spring 96.

As illustrated, the upper end or gripping portion of broaching tool 20 is recessed at 130, to accommodate the gripping balls 94. The upper edges 132 of recess 130 are sloped, to provide a cam action, as later described.

With reference to the operation of the tool head, the parts are illustrated in Fig. 4 in the relative positions occupied by them after engagement of the tool, and during a work movement. During this period, it will be noted, balls 94 occupy recess 130 in broach 20, and sleeve 90 is held in the lower position by spring 96, so that recess 110 is out of registry with balls 94. Accordingly, balls 94 positively retain broach 20 within sleeve 92.

This positioning of the parts results at the time broach 20 is engaged and continues throughout the upward stroke of piston 32 and throughout the downward stroke until the lower end of sleeve 90 engages the face of plunger 126. At this time, the downward movement of sleeve 90 is interrupted. Further downward movement of piston 32 and sleeve 92 causes relative movement between sleeves 90 and 92, which relative movement is taken up by spring 96. In the course of this relative movement, recesses 110 are brought into registry with balls 94. At this time, the downward force exerted on the upper end of broach 20 through plunger by spring 114, cams balls 94 along the surface 132, and into recess 110; and causes broach 20 to fall away from sleeve 92. Plunger 100 closely follows the downward movement of broach 20, so that as the latter passes out of range of balls 94, plunger 100 assumes the position shown in Fig. 3, in which position it is effective to retain balls 94 in the outward position within recess 110.

Recess 110 is moved into broach releasing position at or just before the shoulders 106 of sleeve 90 are engaged by the lower part of collar 98. At the time of the latter engagement downward movement of sleeve 90 is resumed, in the course of which movement plunger 126 is moved inwardly against the force of spring 128. After passing plunger 126 sleeve 90 is retained in substantially the position illustrated in Fig. 3, against the force of spring 96, by balls 94, which are at the time held in recess 110 by plunger 100, as mentioned above.

As will be understood, the interruption in the downward movement of piston 32 may occur at any time after the release of broach 20. It is preferred to effect the stopping of piston 32 just after sleeve 90 passes beyond cam 126, although an earlier stopping may be used. This stopping, as previously described, is accomplished by the opening of switch 62 by cam 84.

After the downward movement of piston 32 is resumed, by operation of foot pedal 64, as previously described, sleeve 92 reaches and passes down over the end of broach 20. In the course of this movement, plunger 100 is engaged by the broach 20 and caused to move upwardly, finally reaching the position illustrated in Fig. 4. The upper end of broach 20 being in engagement with the lower surface of plunger 100 during this movement, balls 94 are prevented from moving inwardly until after broach 20 reaches the position illustrated in Fig. 4. As recess 130 moves into registry with balls 94, the force exerted by spring 96 causes balls 94 to be cammed inwardly by the sloping edges 111 of recess 110. This action moves balls 94 to the position illustrated in Fig. 4, and permits sleeve 92 to move downwardly to the position illustrated in Fig. 4, in which balls 94 are positively retained within recess 130.

It will be observed that with the continuous annular recess 130 as described in connection with Figs. 1 through 5, broach 20 may be supported in head 29 in any one of a plurality of rotative positions with respect to it. In accordance with the arrangement of Fig. 6, the continuous recess 130 previously described is replaced by four individual recesses 140 in broach 20. With this construction, broach 20 must be applied in one of four predetermined relative positions spaced ninety degrees apart.

In accordance with the arrangement shown in Fig. 7 in which the four balls 94 described in connection with the earlier figures are replaced by three balls 142, only one relative positioning between broach 20 and head 29 is possible. It will be noted that the balls 94 are irregularly spaced around head 91, and that three recesses 144 in broach 20 are correspondingly spaced. Because of the irregular spacing, the three recesses 144 register with the three balls 142 only when broach 20 occupies a single predetermined position with respect to head 29. As will be understood, the limitation in the number of positions in which broach 20 may be applied to head 29 is advantageous particularly in connection with the broaching of non-circular apertures.

In accordance with the modification illustrated in Figs. 8 and 9, the previously described balls 94 are replaced by slidable members 150, each of which comprises a somewhat conically formed shank section 152 and an enlarged head portion 154, formed to fit the interior of sleeve 90. Sleeve 92, in accordance with this modification, is provided with the rectangularly formed recess 156 to receive the shanks 152. Broach 20 is provided with the recess 158, the edges of which are angled, to correspond to the angularity of the corresponding surfaces of portions 152. Similarly, sleeve 90 is provided with the recesses 162, the edges of which are angled at 164 to provide the camming action described in connection with the other figures. In all other respects, the construction and arrangement of the modifications shown in Figs. 8 and 9 may be as described in connection with Figs. 1 through 5, and the operation of the last described modification is as described previously.

Although specific embodiments of the present invention have been described, it will be evident that various modifications may be made in the form, number and arrangement of parts without departing from the spirit and scope thereof. The described embodiments, therefore, are to be considered in an illustrative and not in a limiting sense.

What is claimed is:

1. In a machine for operating a tool to be drawn through a work piece, the combination of a head for supporting said tool; driving means for effecting reciprocation of said head over a path including a loading position intermediate the ends of said path; mechanism for effecting the starting, stopping, and reversal of said driving means; and control means for said mechanism operable in accordance with the position of said head and effective to cause said head to start from said loading position, travel to one end position, reverse, travel to the other end position, reverse, and return to said loading position and stop thereat.

2. In a machine for operating a tool to be drawn through a work piece, the combination of a head for supporting said tool; fluid pressure operated means for reciprocating said head over a predetermined path including a loading position intermediate the ends of said path, comprising a cylinder member and a piston member relatively movable therein; means for stationarily supporting one of said members; means for securing said head to the other of said members; valve mechanism for controlling the transmission of fluid pressure to said members; a start control for actuating said valve mechanism to cause said head to start from said loading position and travel to one of said end positions; reversing mechanism responsive to the approach of said head to said one end position for actuating said valve mechanism to reverse the application of fluid pressure to said fluid pressure members and cause said head to travel to the other end position; reversing mechanism responsive to the approach of said head to said other end position for again actuating said valve mechanism to reverse the application of fluid pressure to said fluid pressure members and cause said head to return to said loading position; and stop control means responsive to the approach of said head to said loading position for actuating said valve mechanism to interrupt the application of fluid pressure to said fluid pressure members and stop said head at said loading position.

3. In a machine for operating a tool to be drawn through a work piece, the combination of a head constructed to engage said tool; means for causing said head to move in working and non-working directions; means for supporting said tool adjacent a tool engaging position; and control means for said moving means actuable to cause said head to start from a loading position, travel in said non-working direction to a tool engaging position and there engage said tool, and thereafter move in said working direction and draw said tool through a work piece.

4. In a machine for operating a tool to be drawn through a work piece, the combination of a head constructed to engage and dis-engage said tool; means for moving said head through a reciprocating path including a loading position intermediate the ends of said path; start, stop, and reversing means actuable to cause said head to start from said loading position, travel in one direction to one end position, reverse, travel in a reverse direction to said other end position, reverse, and return to said loading position and stop; means for supporting said tool adjacent said first end position for engagement by said head when said head approaches said first end position; and means responsive to the movement of said head to cause said head to disengage said tool when said head approaches said loading position.

5. In a machine for operating a tool to be drawn through a work piece, the combination of a head constructed to engage and disengage said tool; means for moving said head through a reciprocating path including a loading position intermediate the ends of said path; start, stop, and reversing means actuable to cause said head to start from said loading position, travel in one direction to one end position, reverse, travel in a reverse direction to said other end position, reverse, and return to said loading position and stop; means for supporting said tool adjacent said first end position for engagement by said head when said head approaches said first end position; and means responsive to the movement of said head to cause said head to disengage said tool when said head approaches said loading position, said last mentioned means being effective when said head is moving in said one direction but ineffective when said head is moving in said reverse direction.

6. In a machine for operating a tool to be drawn through a work piece, the combination of a head to engage and disengage said tool; means for moving said head through a reciprocating path including a loading position intermediate the ends of said path; start, stop and reversing means actuable to cause said head to start from said loading position, travel in one direction to one end position, reverse, travel in a reverse direction to said other end position, reverse, and return to said loading position and stop; means for supporting said tool adjacent to said first end position for engagement by said head when said head approaches said first end position; and releasing means responsive to the approach of said head to said loading position traveling in said one direction for causing said head to disengage said tool.

7. In a machine for operating a tool to be drawn through a workpiece, the combination of a head constructed to engage and disengage said tool; operating means for said head comprising means to cause it to move in one direction from a loading position to a tool engaging position, move in an opposite direction to draw said tool through said workpiece, and thereafter return to said loading position; and control means for said head constructed and arranged to cause said head to engage said tool at said tool engaging position and to disengage said tool at said loading position.

8. In a machine having a tool head for passing a tool through a work piece, a work table for supporting said work piece including a stationary member apertured to permit passage of said head, a movable member apertured to permit passage of said tool, and means for resiliently supporting said movable member upon said stationary member.

9. In a broaching machine having a tool head for drawing a tool through a work piece and in which the tool head is adapted to be moved from a loading position to a tool engaging position and thereafter moved in a reverse direction past said loading position through a working stroke, the combination of a workplate against which the workpiece bears during the working stroke comprising a member mounted at said loading position and having an aperture therethrough large enough to permit said head to pass through said member in being moved to said tool engaging position, a second member having an aperture therethrough large enough to permit passage of said tool but not large enough to permit passage of said head, and means connecting said second member to said first member so as to permit relative movement between said first and second members whereby, when said head moves from said loading position to said tool engaging position, said second member is carried along therewith.

10. In a broaching machine for operating a tool to be drawn through a workpiece, a head for supporting said tool, operating means for causing said head to move from a loading position in one direction to a tool engaging position and thereafter to move in an opposite position past said loading position through a working stroke, a workplate against which the workpiece is adapted to bear during the said working stroke, said workplate being apertured to pass said tool, and means movably supporting said workplate upon said machine to permit movement thereof relative to said machine by said head to accommodate said movement of said head from said loading position to said tool engaging position.

11. In a machine for operating a tool to be drawn through a workpiece, a head for supporting said tool comprising an inner member, an outer sleeve, and a tool gripping element; means for moving said head in one direction to draw said tool through said workpiece and in the opposite direction to effect a return movement of said tool; means positioned in the path of said head for engaging said outer sleeve and causing relative movement between said outer sleeve and said inner member when said head reaches an intermediate point in said return movement; means responsive to said relative movement for causing said gripping element to move to released position and thereby release said tool; and means effective during continued return movement of said head for retaining said gripping element in released position.

RICHARD A. THOMPSON.